(12) United States Patent
Frazier

(10) Patent No.: US 10,673,925 B2
(45) Date of Patent: *Jun. 2, 2020

(54) FILE TRANSFER IN A MULTI-NODE NETWORK

(71) Applicant: Simon Frazier, Cypress, TX (US)

(72) Inventor: Simon Frazier, Cypress, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,063

(22) Filed: Aug. 6, 2018

(65) Prior Publication Data

US 2018/0375918 A1 Dec. 27, 2018

Related U.S. Application Data

(63) Continuation of application No. 14/549,402, filed on Nov. 20, 2014, now Pat. No. 10,044,787.

(60) Provisional application No. 61/906,813, filed on Nov. 20, 2013.

(51) Int. Cl.
*H04L 29/08* (2006.01)

(52) U.S. Cl.
CPC ............ *H04L 67/02* (2013.01); *H04L 67/06* (2013.01)

(58) Field of Classification Search
CPC .................................. H04L 67/02; H04L 67/06
USPC .......................................................... 709/217
See application file for complete search history.

(56) References Cited

U.S. PATENT DOCUMENTS

| | | | |
|---|---|---|---|
| 2005/0198292 A1* | 9/2005 | Duursma | G06F 9/54 709/225 |
| 2009/0327908 A1* | 12/2009 | Hayton | G06F 21/6218 715/744 |
| 2010/0011060 A1* | 1/2010 | Hilterbrand | G06F 8/65 709/204 |

* cited by examiner

*Primary Examiner* — Tauqir Hussain
(74) *Attorney, Agent, or Firm* — Norton Rose Fulbright US LLP

(57) ABSTRACT

Methods, systems, programs, and apparatus for the easy, bi-directional transfer of any number of files or directories of files between computer systems, over a LAN, without the need for an Internet connection, preexistence or presence of special or specific software on more than one computer (the "host") in the transaction, or prior knowledge of the platforms or operating systems of more than one (the "host") of the computers constituting an endpoint in the abovementioned transfer.

23 Claims, 3 Drawing Sheets

MESSAGE TRANSMISSION FOR CLIENT INITIALIZATION BLOCK

MESSAGE TRANSMISSION FOR UPLOADING

MESSAGE TRANSMISSION FOR DOWNLOADING

FILE TRANSFER IN A MULTI-NODE NETWORK

CROSS-REFERENCE TO RELATED APPLICATIONS

This application is a continuation of U.S. patent application Ser. No. 14/549,402, filed Nov. 20, 2014, issuing on Aug. 7, 2018, as U.S. patent Ser. No. 10/044,787, entitled "FILE TRANSFER IN A MULTI-NODE NETWORK", which claims priority to U.S. Provisional Application No. 61/906,813, filed Nov. 20, 2013 and entitled "FILE TRANSFER IN A MULTI-NODE NETWORK", the disclosures of which are incorporated herein by reference in their entirety.

BACKGROUND

One of the most common tasks performed by computer users is the transfer of one or more files between two or more computers. This currently may be achieved through specialized hardware, such as a portable USB flash drive, or through software. Software for this purpose can be divided into three main categories: those which are "Peer-to-Peer" (P2P) programs (e.g., programs which use the BitTorrent protocol), those which employ Client-Server architecture (e.g., HTTP and FTP files servers), and "Cloud Programs." Technically, Cloud Programs fall into the Client Server category, but are distinguished here due to their need for Internet connectivity, whereas the first two categories can function on a LAN alone, i.e., without requiring Internet connectivity.

These programs suffer from at least one, or some combination of the following problems: they require an Internet connection, they require special or specific software to be installed on all computers taking part in the transfer—prior to the transfer, and/or they allow only for unidirectional transfers. Additionally, these programs are typically limited by the unavailability of necessary software on certain operating systems or platforms, or are cumbersome or difficult to install or set up. Another limitation is that some of these programs require at least three nodes in a network to effectuate a file transfer, where at least one node performs server/controller functions such as, e.g., coordinating communication, data transfer, and/or protocol conversion and the like, to allow a file exchange between two other nodes.

DESCRIPTION OF THE FIGURES

For a more complete understanding of the concepts described herein, reference is now made to the following descriptions taken in conjunction with the accompanying drawings, in which.

DETAILED DESCRIPTION

Various features and advantageous the present disclosure are explained more fully with reference to the nonlimiting embodiments that are illustrated in the accompanying drawings and detailed in the following description. Descriptions of well-known starting materials, processing techniques, components and equipment are omitted so as not to unnecessarily obscure the present disclosure. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computers-executable instructions that may reside on a computer readable medium (e.g., a hard disk (HD)), hardware circuitry or the like, or any combination.

Figure 1:
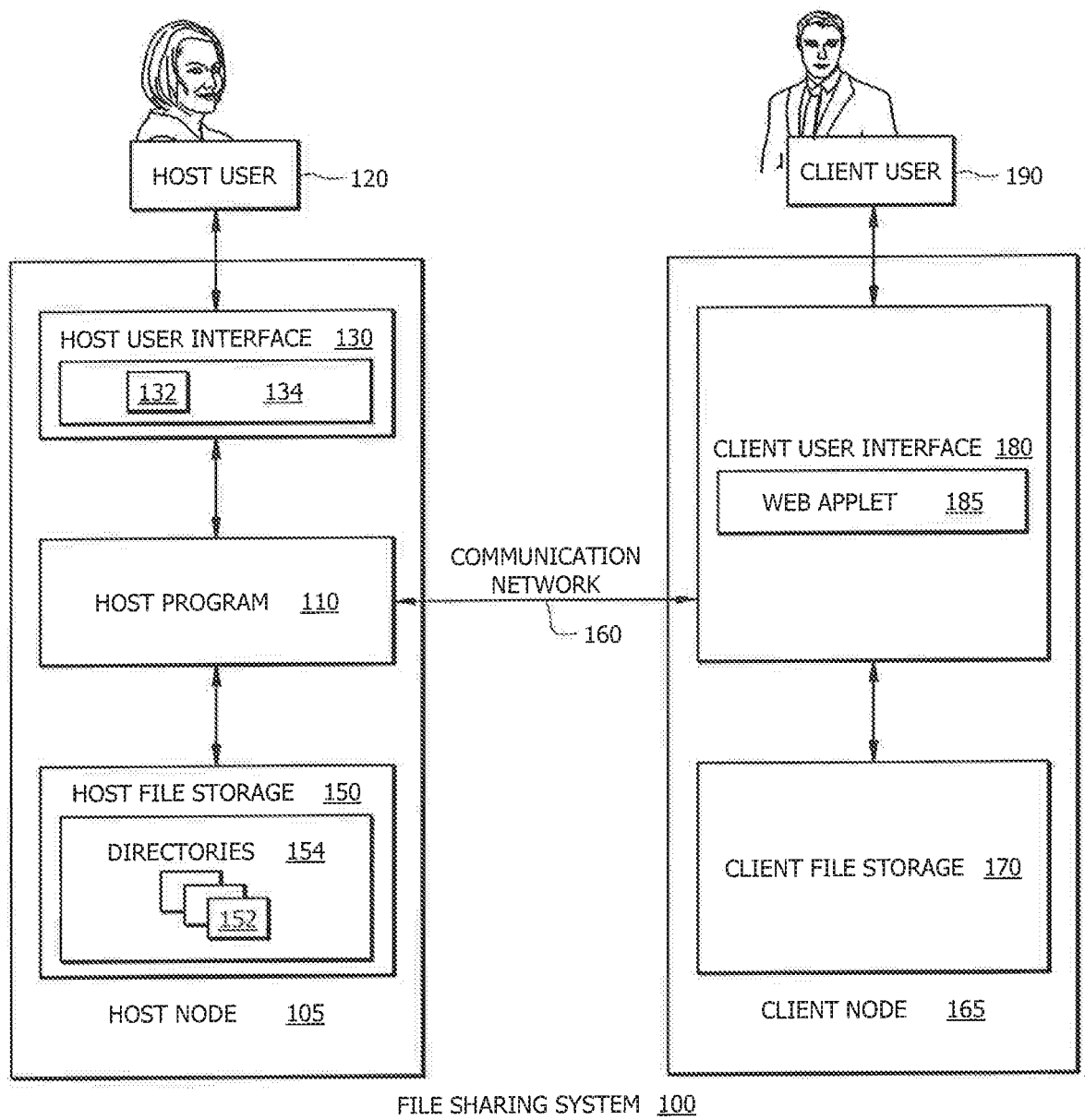
FIG. 1 illustrates an embodiment of a file transfer system in which concepts described herein are applied.

FIG. 1 depicts an exemplary system 100 for file sharing between two nodes over a communication network in accordance with embodiments. The file sharing system 100 includes a host node 105, a communication network 160, and a client node 165, as will be explained in detail below. As will be described herein, system 100 preferably leverages a pervasive communication protocol, such as the HTTP protocol, to transfer a web applet or similar application from a first node to a second node. The web applet provides functionality that makes file transfer between the first node and the second node straightforward for the system user. While the web applet itself is communicated between the first node and the second node using the pervasive protocol, it should be appreciated that once executed, the web applet can execute file transfer between the nodes according to any number of protocols such as FTP, and the like. Importantly, the web applet and subsequent files are transferred between the first node and the second node without the use of an external server or other third node. It should be appreciated that the inventive concepts may also be implemented where, once the applet is downloaded using the HTTP protocol, other protocols such as FTP or Bit Torrent, may be utilized by the applet to effectuate file transfers. In this way, the specific protocol utilized by the applet during file transfer is transparent to the client.

More specifically, a preferred embodiment implements the HTTP protocol in constructing the web applet because HTTP is currently the most pervasive protocol in web browsers. However, support for other protocols, such as FTP and BitTorrent are becoming increasingly standard. Many of these protocols (again, e.g., FTP and BitTorrent) are perhaps better suited for file transfers than HTTP, being designed for them. As such, alternative embodiments will leverage the fact that web browsers increasingly support these and other protocols by default (i.e., without the need for additional pre-installed software or browser modifications). It should be appreciated that, according to inventive concepts described herein, multiple protocols can be implemented in practice of the inventive concepts. For example, the web applet may be initially transferred to the client via HTTP, and then all subsequent transfers between the host and client might be achieved via FTP. It is also possible that a host program may offer a variety of web applets, each which supports file transfers with a different protocol, or that a single web applet my utilize a variety of protocols. The host would necessarily support these as well.

As to implementing these various protocols, appropriate source code of both the host program and web applet will be executed. In a preferred embodiment, libraries or additional resources necessary for the web applet to function will be provided by the host program. For an alternative embodiment implementing different protocol(s), another scheme for uploads, downloads, and synchronization would be utilized via means appropriate to those specific protocol(s). GET and POST requests, for example, are specific only to HTTP, and as such, would not be utilized in embodiments where HTTP is not implemented. Also, different methods of encryption and/or compression appropriate to the protocol(s) would be utilized (e.g., HTTPS is HTTP-specific). The interface of both client and host would perhaps retain the features described in the current HTTP-based embodiment, though naturally new, protocol dependent settings and features would become available. In addition, once the web applet had been initially transferred, other nodes, including that of the host, could communicate with the client via software other than a browser, such as a BitTorrent client or an FTP client, depending on the protocols the applet may use.

As will be described, it should be further appreciated that features stemming from the inventive concepts make file transfers virtually effortless to the user. These features include drag and drop functionality, browsing of the remote file system, searching the remote file system, and seeing lists of and metadata about the remote files and directories. The applet may also display information about ongoing transfers, such as the number of transfers in progress, how much of each transfer has completed, the size of each transfer, the rate of each transfer, and the quantity of transferred data, etc. The host may display such ongoing transfer data as well, and also include the IP addresses or hostnames of clients.

As such, file transfer may be effectuated without internet connectivity where, e.g., the first node and second node are connected to one another over a Local Area Network (LAN) or the like. With the foregoing in mind, the inventive concepts described herein provide a unique file transfer system that eliminates the requirement of internet connectivity and specialized file transfer software installed on both the first node and the second node. Rather, the system may operate where file transferring software is previously installed on only the first, or host node.

According to an embodiment illustrated at FIG. 1, system 100 facilitates a method for sharing files over a communication network where a first node launches a host program. The first node receives a first HTTP request over the communication network from a second node. In response, the first node directly transmits to the second node over the communication network, responsive to the first HTTP request, a web applet. The web applet displays at the second node information relating to files and directories stored on the first node.

The host node 105 includes a host file storage 150 and a host program 110 that is configurable by a host user 120 through a host user interface 130. Different implementations of the host file storage 150, the host user interface 130, and the host program 110 at the host node 105 are contemplated according to concepts described herein. Any combination of the host file storage 150, the host user interface 130, and the host program 110 may be implemented on the same device or different devices. For example, the host file storage 150 may be implemented as a memory storage on the device that runs the host program 110. The host file storage 150 may also be a removable hardware that is detachable from the device that runs the host program 110. Examples of such removable hardware include a USB storage unit, a CD, a DVD, and a flash memory card. Furthermore, the host user interface 130 and the host file storage 150 may be implemented on devices different from the device that executes the host program 110. In this case, the host program 110 communicates with the host user interface 130 and the host file storage 150 through a local area network or the Internet.

The host file storage 150 stores files 152. The files 152 may be stored under one of more directories 154. The files 152 and directories 154 may be marked with information related to access privilege. For clarification, it should be appreciated that access privileges associated with files 152 and directories 154, as maintained by host program 110, are separate from the standard file/folder permissions implemented by the operating system running on the host. By way of example, one file may be marked as downloadable for all client users, downloadable only for one or more client users, or not downloadable for any client users. Additionally, the client users may be assigned to different groups or to different access levels, and a file may be marked to be downloadable only for those client users assigned with selected levels or belong to selected groups. Similarly, a directory may be marked as downloadable for one or more clients users with selected levels or belong to selected groups. When a directory is marked as downloadable to a client user, the files and the subdirectories under the directory is visible to that client user. Conversely, when a directory is marked as not downloadable to a client user, the files and subdirectories under the directory are invisible.

The host program 110 is responsible for managing the file sharing operation at the host node 105. In the client initialization process, the host program 110 transmits a web applet 185 to the client node 165 to establish a client user interface 180. As used herein, the term "applet" denotes applications providing the same or similar functionality, sometimes referred to as an "application," "app," or "program." In a download operation, web applet 185 accesses the host file storage 150 to transmit files to the client node 165. In an upload operation, web applet 185 receives files from the client node 165 and writes them in the host file storage 150. The host program 110 also synchronizes the information related to files 152 and directories 154 on the host file storage 150 with the corresponding information that is displayed at the client node 165. Additionally, the host program 110 determines the IP address of the host node 105 and sends it to the host user interface 130. In another embodiment, the host program 110 sends the hostname of the host node 105 to the host user interface 130. If different components of the host node 105 are implemented on different devices, the IP address or the hostname of the host node 105 is the IP address or the hostname of the device that runs the host program 110.

A host user 120 can configure the operation of the host program 110 through the host user interface 130. In the illustrated embodiment, the host user interface 130 is implemented as an icon 132 on a status bar 134 of OS X. A host user 120 can click the icon 132 to generate a drop down menu. The drop down menu includes controls that the host user 120 can use to configure the host program 110. For example, the drop down menu may include a check box to enable or disable any download operations. The drop down menu may also include a check box to enable or disable any upload operations. Moreover, the drop down menu may include a dialog to show the default settings of various configurable parameters. The host user 120 can change these settings using the dialog. For example, the dialog may show that the default port for transfer is port 80, or alternatively, may monitor any number of ports without designating a single port as a default. The host user 120 can then set the transfer port to one or more different ports using the dialog. Similarly, the host user 120 may set the maximum number of simultaneous download and upload operations using the dialog. The host user 120 may also set the access privilege of the files 152 and the directories 154 on the host file storage 150 using the dialog. Similar to the prior discussion, the host program manages access privileges separately from any such access privileges governed by the operating system itself. According to an embodiment, the dialog may show an option that all uploaded files are downloadable to all client users by default, and the host user 120 can change this option using the dialog.

Additionally, the host user 120 may configure default compression and decompression options of the file sharing process. For example, the host user 120 can set a default option using the dialog so that a file is automatically compressed before it is transmitted and automatically decompressed after it is received. Compression may reduce actual transfer time by reducing the size of the files actually transferred. According to one implementation the host program 110 may create an icon in the "dock" interface, which opens a configuration dialog when clicked. Another possibility would be the creation of a plugin and icon in the "System Preferences" utility. Finally, the program might be configured through a "Widget" which is accessible through the "Dashboard" interface. According to another implementation, these functions are dependent upon the host platform and OS. For example, on Microsoft Windows 7, the program could create an icon in the "icon tray" located in the bottom right corner. Options could be set through a popup menu or dialog which appears when the icon is clicked. On a mobile platform, such as iOS, which only allows one app to be run at a time, controls to configure the program might simply be displayed when the program is launched, as the app's "default" screen.

The client node 165 includes a client file storage 170 and a client user interface 180 that is operable by a client user 190. Different implementations of the client file storage 170 and the client user interface 180 at the client node are contemplated according to concepts described herein. In one example, the client file storage 170 is implemented on the same device that runs the client user interface 180. Examples of such device include a laptop computer, a desktop computer, a tablet, or a smart phone. In another example, the client file storage 170 is implemented as a removable hardware that can be detached from the device that runs the client user interface 180. Examples of such removable hardware include a USB storage unit, a CD, a DVD, and a flash memory card. In yet another example, the client file storage 170 is implemented on a device that is different than the device that runs the client user interface 180, where the client user interface 180 is coupled with the client file storage 170 through a local area network or the Internet.

The client user interface 180 is a web browser that supports HTTP protocols with a web applet 185 running thereon. Examples of the web browser include an Internet Explorer, a Google Chrome, and a Firefox browser. The web applet 185 is an applet that manages the file sharing operation at the client node 165. Because the web applet 185 runs on the web browser, it enables the client user 190 to upload and download files without requiring either a client software or a component of the host program 110 on the client node 165. The web applet 185 is also configured to display the information related to the files 152 and the directories 154 of the host file storage 150 in the client user interface 180. The information that is displayed may further include the access privilege information of the files 152 and the directories 154 so that the client user 190 can see which files and directories are available for downloading. The information that is displayed may further include other meta data: e.g., the sizes and the MIME types of the files 152.

The client user 190 may initiate a download operation by accessing the client user interface 180 utilizing various mechanisms. For example, the client user 190 may simply click a file or a directory displayed in the client user interface 180 to initiate downloading. Alternatively, client user 190 may initiate downloading by pressing one or several appropriate hotkeys on a keyboard. According to another embodiment, client user 190 may initiate a download by requesting a file directly. Similarly, the client user 190 may initiate an upload operation by accessing the client user interface 180. First, the client user 190 navigates the information displayed in the client user interface 180 to choose a directory under which he intends to upload a file or the host may be configured to provide a limited set of choices to user 190 so that the host directory may or may not be displayed to user 190. Then, the client user 190 selects the file to upload to the designated directory. If, for example, the web browser of the client user interface 180 supports drag and drop file APIs, then the web page displayed by the client user interface 180 comprises one or more drop targets when the web applet 185 is running. In this way, several displayed drop targets represent several specific directories that may be provided to received uploaded files. Otherwise, a full page or single displayed drop target may cause the client to upload to another specific, or default directory. These functions may be implemented through client-side languages and libraries, such as JavaScript, HTML, and JQuery although not limited to these. The client may request, via HTTP, that the host program send necessary files or libraries which are requisite for this. The client user 190 then may drag the file into the web page to initiate the uploading of the file. The client user 190 may also drag multiple files into the web page to initiate a batch upload. Other user interface methods to initiate an upload operation are also supported. For example, the client user interface 180 may support a "browse and select" operation. In a "browse and select" operation, the client user 190 click the client user interface 180 to launch a window that displays the contents of the client file storage 170. The client user 190 then browses through the directories on the client file storage 170 and selects the file to upload.

This operation is particularly useful if the web browser of the client user interface 180 does not fully support drag and drop file APIs and may be implemented through code executed at the client, such as the "form" tag of HTML. This code is interpreted by the browser to cause the desired functionality. The web applet communicates with the OS via the web browser. As per w3 standards, resultant behavior ultimately rests with the web browser. For example, a desktop browser (such as firefox, chrome, opera, etc.), upon the user clicking a button in the web page, initiates a browse dialog to choose a file to upload. On the other hand, a browser running on a mobile device might fail to render the button at all, as mobile operating systems (e.g. iOS) often lack a "user-browsable" file system, and thus would not provide a dialog to choose a file.

The communication network 160 can be a local area network or the Internet. In one embodiment, one or more messages transmitted between the host program 110 and the client user interface 180 are encrypted. The encrypted messages may be transferred over a standard HTTPS socket. Other methods to secure the transmission over the communication network 160 can also be used.

Figure 2:
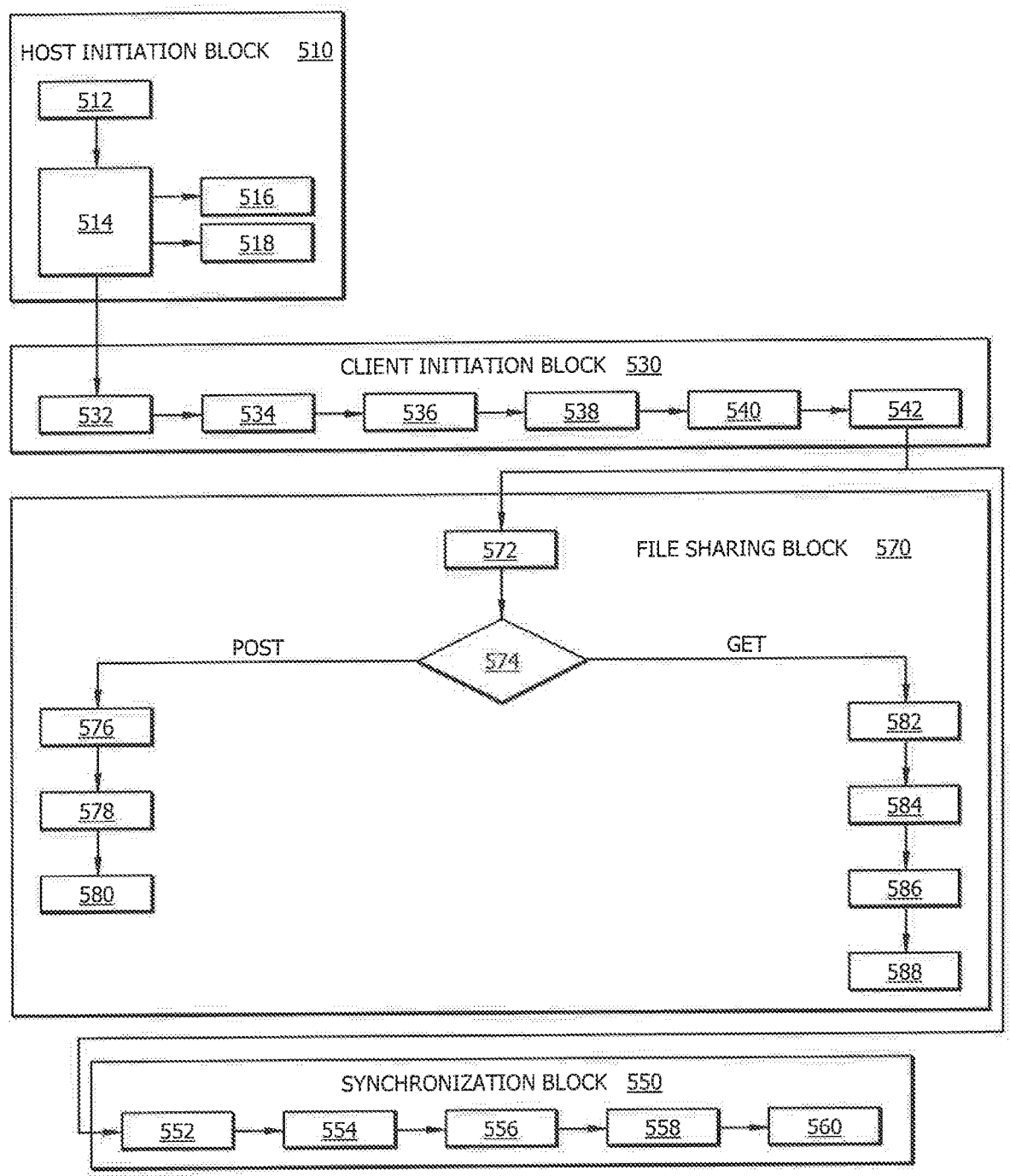
FIG. 2 is a flow chart of a file transfer process according to an embodiment.

The file sharing process is illustrated more particularly with reference to the flowchart 500 of FIG. 2. The flowchart 500 includes a host program initialization block 510, a client initialization block 530, a synchronization block 550, and a file sharing block 570, as will be explained in greater detail below.

Initially, at step 512, the host program 110 is launched at the host node 105. In one embodiment, the host program 110 may be one of several programs launched by an operating system upon startup, in a device at the host node 105. Thus the host program 110 may be automatically launched when the device is booted. At step 514, the host program 110 launches the host user interface 130. As discussed above, the host user interface 130 may run on the same device that runs the host program 110 or on a different device that is in communication with the device that runs the host program 110. At step 516, the host user 130 configures the operation of the host program 110 through the host user interface 130 by changing default, or otherwise configurable parameters, as previously discussed. At step 518, through the host user interface 130, the host user 120 configures the host file storage 150. Configuration of the host file storage 150 may include designating a memory location to be the host file storage 150, setting up directories 514 on the host file storage 150, copying files 152 onto the host file storage 150, and setting the access privilege information of the files 152 and the directories 514 as described previously. However, it should be appreciated that, in one embodiment, the host does not distinguish between separate physical or virtual storage devices. Rather, the host simply considers "paths" provided by such storage. Step 516 and step 518 can be repeated at any time throughout the operation of the system 100.

The client initialization block 530 illustrates the client initialization process, which may or may not be completed before a client user 190 can upload or download a file. According to a preferred embodiment, client user 190 does not download a file via the applet before the applet has finished downloading. At step 532, the client user 190 opens a web browser at the client node 165 and types the IP address of the host node 105 in the web browser. The IP address may be an IPv4 address or an IPv6 address. As discussed before, the IP address of the host node 105 may be displayed at the host user interface 130. The host user 130 may communicate the IP address to the client user 190 by an email, a text, or any other communication methods. Information designating a specific port may be transmitted along with the IP address if the host program 110 is configured to use a port of transfer other than port 80. In another embodiment, the hostname of the host node 105 may be displayed at the host user interface 130 and communicated to the client user 190. The client user 190 then enters the hostname in the client user interface 180 instead of the IP address. At step 534, the browser sends a HTTP GET request to the host program 110 over the communication network 160. If the client user 190 enters a hostname instead of an IP address in the web browser, the web browser will contact a DNS server to retrieve the corresponding IP address and then send it in the HTTP GET request. The host program 110 is configured to listen on a socket on either the default port 80 or the port that is designated by the configuration of the host user 120. At step 536, the host program 110 listens to the port of transfer and receives the HTTP GET request. Additional clients or the same client may initiate more requests before a given connection has completed. As such, the port is always in a listening state, unless the host user has configured the port differently. At step 538, the host program 110 determines that the HTTP GET request is for the web applet 185 if the HTTP GET request does not include an address for any web pages. According to another embodiment, host program 110 may make such determination in other ways where, e.g., host program 110 determines the request is for the applet if the requested URL contains a specific path. At step 540, the host program 110 transmits a HTTP GET response that includes a client interface page to the web browser at the client node 165. The client interface page encapsulates the web applet 185. The HTTP GET response may also encapsulate a JSON, XML, etc., list that includes the information related to the files 152 and the directories 154 of the host file storage 150. At 542, the web browser at the client node 165 receives the HTTP GET response and runs the web applet 185, which executes and encapsulates the client user interface 180. The client user interface 180 may also display the information related to the files 152 and the directories 154 on the host file storage 150 according to the JSON list in the HTTP GET response.

The file sharing block 570 illustrates the process of uploading and downloading a file. At step 572, the client interface 180 sends a HTTP request to the host program 110 over the communication network 160. At step 574, the host program 110 receives the HTTP request and reads the header of the HTTP request to determine the requested HTTP method.

If the requested HTTP method is POST, then the HTTP request is generated by the client user 190 who intends to upload a file. As described previously, the client user initiates the upload operation through the client user interface 180, which triggers the web applet 185 to generate the HTTP request and encapsulate the uploaded file(s) and other information needed for reconstruction by the host in the body of the HTTP request. The designated directory is the directory on the host file storage 150 where the client user 190 intends to upload the file, which is initially chosen by the client user 190 through the client user interface 180 as discussed previously. Ultimately, however, the host controls where it will store the received file, perhaps storing the received file in a default or otherwise specified directory, as illustrated by steps 516 and 518. At step 576, the host program 110 receives the HTTP request and writes the uploaded file in the designated directory on the host file storage 150.

The upload operation can also support uploading an entire directory of files. For example, the web applet 185 may generate a meta data of a directory. The meta data includes the hierarchy information of the directory and the meta data information of files and subdirectories under the directory. The web applet 185 may generate the meta data by recursively enumerate the contents of the directory. The web applet 185 then includes the meta data and the files under the directory in the HTTP request and transmits the HTTP request to the host program 110 at step 572. Thus at step 576, the host program can reconstruct the directory hierarchy at the host file storage 150 based on the meta data and write the files under the directory and its subdirectories accordingly.

If the requested HTTP method is GET, then the HTTP request is generated by the client user 190 who initiates a download operation through the client user interface 180. The host program 110 checks the HTTP request to first determine whether the request is to download a file or a directory. However, this information is not coded into the request itself because, to an operating system, a directory is merely a file that contains other files. As such, in a preferred embodiment, the host program is responsible for determining if a requested resource (i.e., all things requested by an HTTP request are treated as resources) is a directory or a true "file." A requested resource may not actually exist in either file or directory form. For example, the host response for the default page is a composite, comprising a web applet, a list of directory and file metadata, and a web page.

The web applet 185 can use the metadata to display the contents of the directory in the client interface 180. Examples of the metadata of the directory includes the name of the files and subdirectories under the directory. At step 582, the host program 110 determines whether the requested file or directory is marked as downloadable to this user. The host program 110 may accomplish this by simply examining whether the requested file or directory is accessible according to the privileges afforded to the client user. The host program 110 may also examine the access privilege information configured for the requested file or directory to determine whether the requested file or directory is downloadable to the particular client user. At step 584, the host program generates a GET response. If the requested file or directory is downloadable, the GET response includes the requested file or the metadata pertaining to the requested directory. If the requested file or directory is not downloadable, the HTTP GET response includes an error indication. At step 586, the host program 110 transmits a HTTP GET response that includes the file or directory file for the requested directory. At step 588, the client receives the GET response, and processes its contents appropriately. In the case of a single file, the file is handled in whatever way the web browser would handle any such "normal" file download from any website. From the browser's perspective, there is no difference, as the same HTTP protocol is used in both cases. The web applet would typically perform "decoding" or an analogous operation only in the case of a multiple file download or upload (as that described in more detail herein), since application layer code would be necessary. As will be appreciated by those of skill in the art, the actual algorithm or code used to decode the metadata is independent of the inventive concepts. Technically, the manner in which the browser handles "normal" downloads is also application layer, but the code already exists (within all web browsers).

The downloading function can also support downloading of files in an entire directory, including contents of its subdirectories. For example, while displaying a directory of the host file storage 150 in the client user interface 180, the web applet 185 may configure the client user interface 180 to include a control for downloading files under an entire directory. The control can be a checkbox next to the directory and/or its subdirectories or an additional link next to the directory and/or its subdirectories. If the client user 190 desires to download all the files under the entire directory, he can activate the control by checking the checkbox before clicking the directory or clicking the additional link next to the directory instead of clicking the directory itself. Once the web applet 185 receives the activation of the control, it includes a flag in the HTTP request that is sent at step 572 to indicate a request for downloading files under an entire directory. When the host program 110 determines at step 582 that the request is for downloading files under an entire directory, it will generate a meta data of the directory. The meta data includes the hierarchy information of the directory and the meta data information of files and subdirectories under the directory. The host program 110 may generate the meta data by recursively enumerating the contents of the directory. The host program 110 then includes the meta data and all the files under the directory in the HTTP GET response at step 584 and transmits them in the HTTP GET response at step 586. Thus at step 588, when the client user interface 180 receives the HTTP GET response, the web applet 185 can reconstruct the directory hierarchy at the client file storage 170 based on the meta data and write the files under the directory and its subdirectories accordingly.

Looking forward, other HTTP methods may also be used to implement the communications between the host program 110 and the client user interface 180 described above. For example, PUT can be used instead of POST to upload the file. However, no other method substitutions would be appropriate under the current HTTP standard (1.1 at the time of writing) as specified by w3: http://www.w3.org/Protocols/rfc2616/rfc2616-sec9.html.

The synchronization block 550 illustrates a process of synchronizing the information of the host file storage 150 with the information that is displayed in the client user interface 180. At step 552, the host program 110 receives an alert on any changes of the host file storage 150. The alert may be generated by the operating system on the device that the host file storage 150 resides when there is a change regarding the files 152 or the directories 154 of the host file storage 150. For example, when a file is added, deleted, or renamed, or when the access privilege information of the file is changed, an alert is sent to the host program 110. The "alert" may be a message sent from the operating system to a compiled piece of code. According to an embodiment, for the operating system, there will be a library which provides this functionality. At step 554, the host program 110 generates a JSON, XML, etc., list that represents the updated information of the files 152 and the directories 154 of the host file storage 150. At step 556, the host program 110 estimates which client user interfaces 180 that are currently displaying the information related to the files 152 and the directories 154 of the host file storage 150. The estimate may be based on previous requests from each client, because HTTP is not stateful. If the resultant update is inappropriate for given client, the client will ignore the message. In other embodiments (which used a stateful protocol), it may be possible for the host to estimate with enough accuracy to say that the host "determines" the state of the client. According to an embodiment, the host program does not determine if a client is viewing a page, since without cookies (i.e., cookies are not utilized by the program) HTTP clients are inherently stateless from a server's perspective. The program iterates through each client and determines if the last directory requested by it matches that which the alert regards. If so, it sends an update to that client. At step 558, the host program 110 transmits a HTTP message that encapsulates the JSON list to the client user interface 180. As known in the art, there are several choices of libraries, languages, etc., that can be used to this end. As such, a particular implementation does not affect the uniqueness of the invention. At step 560, the client user interface 180 receives the HTTP message. The web applet 185 retrieves the JSON list, and displays the updated information of the host file storage 150 in the client user interface 180.

Figure 3:
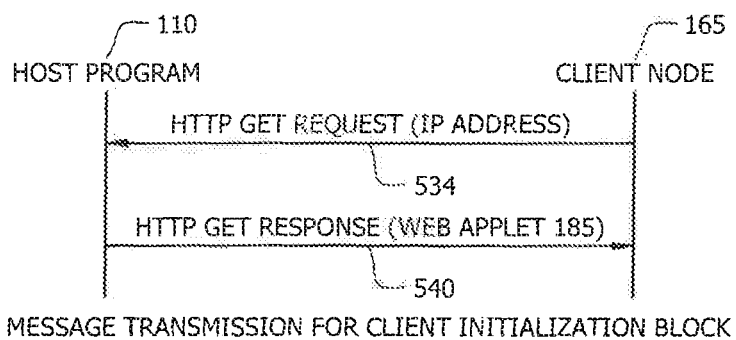
FIG. 3 is a signal diagram according to an aspect of an embodiment.

FIG. 3 illustrates an example of the messages transmitted between the host program 110 and the web browser at the client node 165 during the client initialization process. It should be understood that the initialization process is merely a subset of a standard HTTP request/response transaction. As described previously, at step 534, the web browser at the client node 165 sends an HTTP GET request to the host program 110. At step 540, the host program 110 sends a HTTP GET response that includes a client interface page to the client node 165. The client interface page encapsulates the web applet 185. When the web browser runs the web applet 185, the web browser executes and encapsulates the client user interface 180

Figure 4:
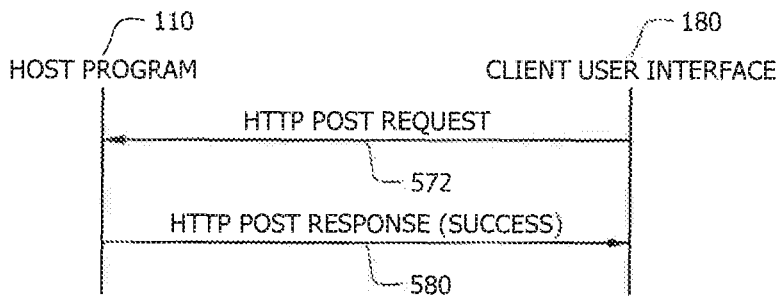
FIG. 4 is a signal diagram according to another aspect of an embodiment.

FIG. 4 illustrates an example of the messages transmitted between the host program 110 and the client user interface 180 during an upload operation, where single file and directory uploads may be distinguished as described herein. As described previously, at step 572, the client user interface 180 sends a HTTP POST request to the host program 110. At step 580, the host program 110 sends a HTTP POST response to the client interface 180 to confirm that the uploading is successful.

Figure 5:
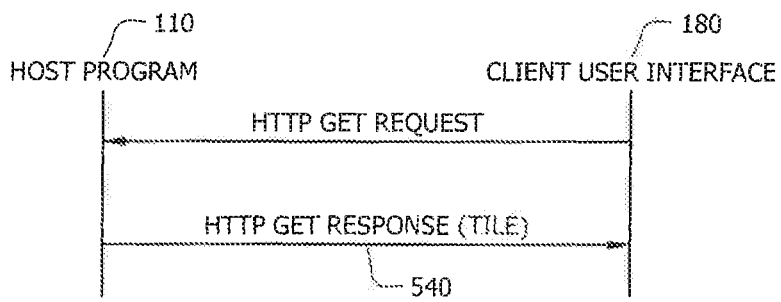
FIG. 5 is a signal diagram according to another aspect of an embodiment.

FIG. 5 illustrates an example of the messages transmitted between the host program 110 and the client user interface 180 during a download operation, where single file and directory downloads may be distinguished as described herein. As described previously, at step 572, the client user interface 180 sends a HTTP GET request to the host program 110 to request downloading of a file. At step 586, the host program 110 sends a HTTP GET response that includes the requested file(s) or a corresponding error indication.

Figure 6:
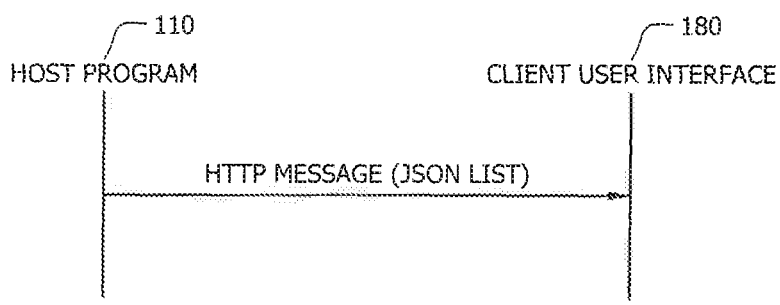
FIG. 6 is a signal diagram according to another aspect of an embodiment.

FIG. 6 illustrates an example of the messages transmitted between the host program 110 and the client user interface 180 during the synchronization process. As described previously, at step 558, the host program 110 sends a HTTP message to the client user interface 180. The HTTP message includes an updated JSON list.

Although the present disclosure has been described in terms of specific embodiments, these embodiments are merely illustrative, and not restrictive. The description herein of illustrated embodiments, including the description in the Abstract and Summary, is not intended to be exhaustive or to limit the disclosure to the precise forms disclosed herein (and in particular, the inclusion of any particular embodiment, feature or function within the Abstract or Summary is not intended to limit the scope of the disclosure to such embodiments, features or functions). Rather, the description is intended to describe illustrative embodiments, features and functions in order to provide a person of ordinary skill in the art context to understand the present disclosure without limiting same to any particularly described embodiment, feature or function, including any such embodiment feature or function described in the Abstract or Summary. While specific embodiments are described herein for illustrative purposes only, various equivalent modifications are possible, as those skilled in the relevant art will recognize and appreciate. As indicated, these modifications may be made in light of the foregoing description of illustrated embodiments and are to be included within the spirit and scope of the disclosure. Thus, various changes and substitutions are intended in the foregoing disclosures, and it will be appreciated that in some instances some features of embodiments will be employed without a corresponding use of other features without departing from the scope and spirit as set forth. Therefore, many modifications may be made to adapt a particular situation or material.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein.

In the description herein, numerous specific details are provided, such as examples of components and/or methods, to provide a thorough understanding of described embodiments. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments. A person of ordinary skill in the art will recognize that additional embodiments are readily understandable from the disclosure.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used, individually or in conjunction with another programming language, to implement the routines, methods or programs of embodiments described herein, including C, C++, Java, JavaScript, HTML, or any other programming or scripting language, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the described embodiments.

It is also within the spirit and scope of the disclosure to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. Various embodiments may be implemented by using software programming or code in one or more general purpose digital computers, by using application specific integrated circuits, programmable logic devices, field programmable gate arrays, optical, chemical, biological, quantum or nanoengineered systems, or components and mechanisms may be used. In general, the functions of various embodiments can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

The invention claimed is:

1. A method for sharing files between a host node and a client node over a communication network without the use of another node where file transfer software is not installed at the client node, the method comprising:

launching, at the host node, a host program that manages file sharing operations for the host node;

receiving, at the host node, over the communication network from the client node, a request for a web applet web applet where the web applet executes at least one of:
  file uploading, and
  file downloading;

transmitting the web applet, from the host node, to the client node over the communication network using an HTTP communication protocol, where, when executed at the client node, the web applet:
  runs in a web browser of the client node,
  manages file transfer between the host node and the client node using at least one of the HTTP communication protocol and a non-HTTP protocol,
  displays, in the web browser, information relating to files and directories stored at the host node; and retrieving, at the host node, a file that is encapsulated in the request for file uploading, or transmitting, from the host node, an HTTP response to the client node comprising a file requested in the request for file downloading.

2. The method of claim 1 where the displayed information comprises information on whether the files and directories are downloadable.

3. The method of claim 2 where the web applet enables file sharing directly between the host node and the client node by using the HTTP communication protocol.

4. The method of claim 2 where the host program is operable to synchronize with the web applet to display at the client node an updated version of the displayed information related to files and directories stored on the host node.

5. The method of claim 1 where the request for the web applet is initiated by entering an IP address or hostname into a web browser at the client node.

6. The method of claim 1 where the web applet may initiate an upload request to the host node web applet by using a drag and drop interface at the client node.

7. The method of claim 1 further comprising:
transmitting, from the host node, a message to the client node to confirm that an uploaded file is received.

8. The method of claim 1 where the upload request transmitted to the web applet comprises a meta data of a first directory, and further comprising:
reconstructing, at the host node, a second directory based on the meta data; and
writing the uploaded file under the directory based on the meta data.

9. The method of claim 8 where the meta data is generated by recursively enumerating the first directory.

10. An apparatus for sharing files between a host node and a client node over a communication network without the use of another node where file transfer software is not installed at the client node, the method comprising:
a memory; and
one or more processors communicatively coupled to the memory, the one or more processors configured to execute instructions comprising:
launching, at the host node, a host program that manages file sharing operations for the host node;
receiving, at the host node, over the communication network from the client node, a request for a web applet where the web applet executes at least one of:
file uploading, and
file downloading;
transmitting the web applet, from the host node, to the client node over the communication network using an HTTP communication protocol,
where, when executed at the client node, the web applet:
runs in a web browser of the client node,
manages file transfer between the host node and the client node using at least one of the HTTP communication protocol and a non-HTTP protocol,
displays, in the web browser, information relating to files and directories stored at the host node; and
retrieving, at the host node, a file that is encapsulated in the request for file uploading, or transmitting, from the host node, an HTTP response to the client node comprising a file requested in the request for file downloading.

11. The method of claim 10 where the displayed information comprises information on whether the files and directories are downloadable.

12. The method of claim 11 where the web applet enables file sharing directly between the host node and the client node by using the HTTP communication protocol.

13. The method of claim 11 where the host program is operable to synchronize with the web applet to display at the client node an updated version of the displayed information related to files and directories stored on the host node.

14. The method of claim 10 where the request for the web applet is initiated by entering an IP address into a web browser at the client node.

15. The method of claim 10 where the web applet may initiate an upload request to the host node by using a drag and drop interface at the client node.

16. The method of claim 10 further comprising:
transmitting, from the host node, a message to the client node to confirm that an uploaded file is received.

17. The method of claim 10 where the upload request transmitted to the web applet comprises a meta data of a first directory, and further comprising:
reconstructing, at the host node, a second directory based on the meta data; and
writing the uploaded file under the directory based on the meta data.

18. The method of claim 17 where the meta data is generated by recursively enumerating the first directory.

19. An apparatus for sharing files over a communication network, the method comprising:
a memory; and
one or more processors communicatively coupled to the memory, the one or more processors configured to execute instructions comprising:
receiving, at a host node, a first HTTP request over the communication network from a client node; and
transmitting, from the host node, responsive to the first HTTP request, a web applet over the communication network to the client node,
where, when executed at the client node, the web applet:
runs in a web browser of the client node,
manages file transfer between the host node and the client node using at least one of a HTTP communication protocol and a non-HTTP protocol,
displays, in the web browser, information relating to files and directories stored at the host node;
receiving, at the host node, over the communication network from the client node executing the web applet, a request for at least one file or directory displayed in the web browser; and
transmitting, from the host node, to the client node over the communication network, the at least one file or directory using the at least one of the HTTP communication protocol and the non-HTTP protocol.

20. The method of claim 19 where the first HTTP request is initiated by entering an IP address or hostname into a web browser at the client node.

21. The method of claim 19 where the web applet is transmitted over an encryption layer.

22. The method of claim 1 where the web applet:
further displays at the client node information indicating which of the files and directories are available for download to the client node.

23. The method of claim 19 where the web applet:
further displays at the client node information indicating which of the files and directories are available for download to the client node.

* * * * *